US006996507B1

(12) United States Patent
Myr

(10) Patent No.: US 6,996,507 B1
(45) Date of Patent: Feb. 7, 2006

(54) COMPUTER-IMPLEMENTED METHOD AND SYSTEM FOR DESIGNING TRANSPORTATION ROUTES

(75) Inventor: David Myr, Jerusalem (IL)

(73) Assignee: Makor Issues and Rights Ltd., Jerusalem (IL)

( * ) Notice: Subject to any disclaimer, the term of this patent is extended or adjusted under 35 U.S.C. 154(b) by 0 days.

(21) Appl. No.: 09/831,093

(22) PCT Filed: Oct. 13, 1999

(86) PCT No.: PCT/IL99/00538

§ 371 (c)(1),
(2), (4) Date: Jul. 20, 2001

(87) PCT Pub. No.: WO00/28448

PCT Pub. Date: May 18, 2000

(30) Foreign Application Priority Data

Nov. 9, 1998 (IL) ...................................... 126962

(51) Int. Cl.
*G06F 17/10* (2006.01)
*G06F 17/60* (2006.01)
(52) U.S. Cl. .................... 703/2; 703/1; 172/1; 175/424
(58) Field of Classification Search .................... 703/1, 703/2; 707/104.1; 172/1, 4.5; 342/457; 175/57, 424
See application file for complete search history.

(56) References Cited

U.S. PATENT DOCUMENTS

| | | | | |
|---|---|---|---|---|
| 5,375,663 | A | 12/1994 | Teach | 172/4.5 |
| 5,517,428 | A | 5/1996 | Williams | 703/1 |
| 5,574,841 | A | 11/1996 | Thompson et al. | 345/418 |
| 5,631,658 | A | 5/1997 | Gudat et al. | 342/457 |
| 5,745,751 | A | 4/1998 | Nelson et al. | 707/104.1 |

OTHER PUBLICATIONS

Askew et al., Computer Aided Generation of Earthwork Activities in Project Planning, Developments in Computation Techniques for Civil Engineering, Aug. 1995, pp. 17-23.*
Minami et al., Earthwork Planning System by Microcomputer, Proceedings of the 1st Int. Conference on Engineering Software for Microcomputers, Apr. 1984, pp. 643-655.*

(Continued)

*Primary Examiner*—Russell Frejd
(74) *Attorney, Agent, or Firm*—Ladas and Parry LLP

(57) ABSTRACT

A computer-implemented method and system for designing transportation routes, wherein design criteria to be met in respect of at least one of said transportation routes are supplied and route profile data are obtained showing land heights at sampled points along each of said at least one transportation route. Per-unit cost estimates in respect of land-cut and land-fill operations are supplied, and a height profile is computed of the at least one transportation route which meets the design criteria and for which the land-cut and land-fill operations are adjusted to give a minimum cost.

27 Claims, 5 Drawing Sheets

OTHER PUBLICATIONS

Roberts et al., Use of Computers for Road Design, Proceedings of the Institution of Civil Engineers, vol. 42, Jan. 1969, pp. 105-128.*

Bradley et al., Developing the Real-Time Autonomous Excavation—The LUCIE Story, Proceedings of the 34th IEEE Conference on Decision and Control, vol. 3, Dec. 1995, pp. 3028-3033.*

Allen, L.G., et al. Cost Effective Design-The Use of Computer Aided Drafting in: Selection, Earthworks Optimisation and Rial Track Engineering Peerth/Australia (1987) pp 114-118 XP00917757.

Flood, I., et al. Modeling Constructing Process Using Artificial Neural Networks Automation in Construction 4 (1996) pp 307-320.

Papamichael, K, et al., Building Design Advisor: Automated Integration of Multiple Automation in Construction 6 (1997) pp 341-352.

Sacks, R., et al., A Project Model for an Automated Building System: Design and Planning Phases Automation in Construction 7 (1997) pp 21-34.

* cited by examiner

Existing profile —
Proposal profile —

Existing profile ————
Proposal profile ———

A, B, C, D, E are existing CPs elevations.

A', B', C', D', E' are proposal CPs elevations.

COMPUTER-IMPLEMENTED METHOD AND SYSTEM FOR DESIGNING TRANSPORTATION ROUTES

FIELD OF THE INVENTION

This invention relates to techniques for designing transport routes.

BACKGROUND OF THE INVENTION

Conventional approaches to the road design rely on separate design for each road system. Thus, the design of road systems usually begins with the planning stage where a civil engineer arranges the road to satisfy the standard specifications such as grade and meeting of centerlines at intersections. Then a draftsman produces an initial design using one of numerous software programs to draft profiles, vertical alignment, measure cross-sections and calculate the cut and fill quantities. In this connection, it will be appreciated that road surfaces are generally not level. Whenever a gradient is associated with the road surface, this requires that, during construction, earth be removed ("cut") from those sections which are lower than the foundation level and that earth be added to those sections which are higher than the foundation level and must therefore be "filled". Such earthworks require skilled operation of heavy and expensive machinery and is therefore highly costly. It is therefore desirable, as far as is possible, to equalize the cut and fill quantities so as to avoid unnecessary earthworks.

Such equalization is an iterative process requiring repeated fine-tuning by the engineer. The iteration may be repeated numerous times before the road system satisfies all of the physical constraints and the cut and fill quantities are properly balanced. Conventionally, the design has been a trial and error affair according to the experience of the civil engineer. The vertical alignment is determined for one road at a time and not for the entire road system. Earthworks of subdivision lots which border transportation routes have also not conventionally been taken into account, nor has the economical factor been properly considered.

A CAD approach to the design of rail tracks is presented by L. G. Allen et al. in "*Cost Effective Design—The Use of Computer Aided Drafting In: Route Selection, Earthworks Optimisation and Rail Track Engineering*" appearing in Conference on Railway Engineering, Perth/Australia, September 1987; XP-000917757. However, this article makes no reference to minimization of earthworks cost. Rather it attempts to achieve cost-effective design using an interactive CAD process. Thus, cost effectiveness is the result of user's interactive work (i.e. trial and error) and is not an automatic computerized process that uses pre-prepared data allowing the route to be optimized without any user interaction. In this respect, the CAD tools disclosed by this article are typical of prior art methods that relate on trial and error for optimizing transportation routes.

SUMMARY OF THE INVENTION

A principal the object of the invention is thus to develop a method of road design that results in lower construction cost.

A further object of the invention is to facilitate comparison of different layouts and different unit prices so as to obtain better cost-effectiveness during the preliminary planning stage.

According to a broad aspect of the invention there is provided a computer-implemented method for designing transportation routes, the method comprising the steps of:
(a) supplying linear constraints of allowable grades to be met in respect of at least one of said transportation routes,
(b) obtaining route profile 3-D coordinates showing land heights at sampled points along each of said at least one transportation route prior to construction thereof,
(c) supplying cost estimates per working unit in respect of land-cut and land-fill operations, and
(d) computing a height profile of said at least one transportation route which meets said constraints and for which said land-cut and land-fill operations are adjusted to give a minimum cost by replacing all non-linear constraints by equivalent linear constraints so as to render the height profile solving using standard linear programming tools.

Such a method establishes a direct relationship between prevailing economic conditions and the status of the transportation system as a technical entity. The method according to the invention utilizes customized optimization which operate on raw data generated by a computer-aided design (CAD) program. Such raw data includes: topography, roads centerlines plan, road cross-sections and earthwork unit prices. It is to be noted that the invention is also applicable to railway transport systems, and within the context of the following description and claims, a "transport system" is any highway system comprising one or more roads, pedestrian routes or rail tracks or a combination thereof. The invention is of particular benefit for the optimization of complete transport systems having many intersecting roads or rail tracks, whilst nevertheless being applicable to the design of single transport routes only.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
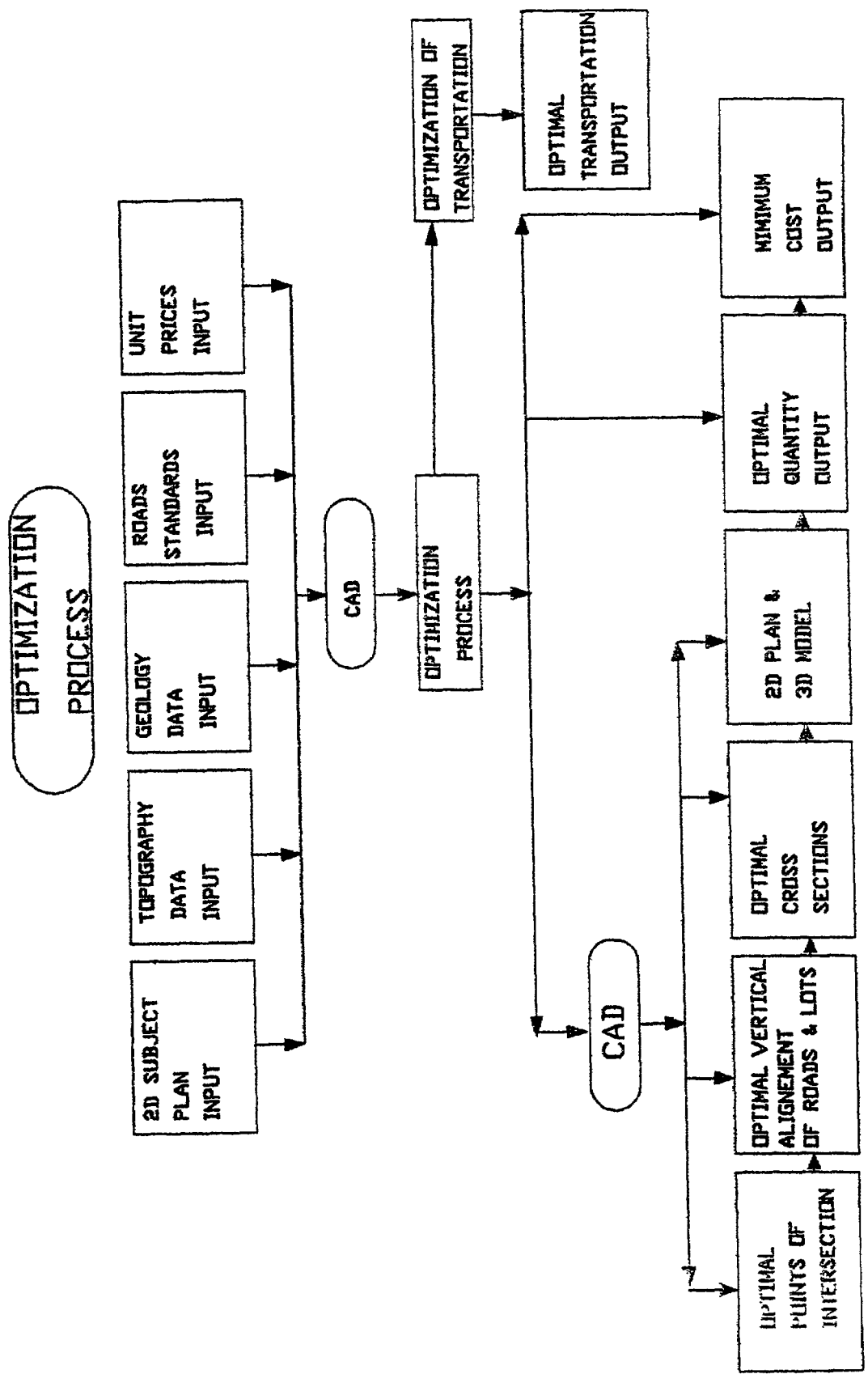
FIG. 1 is a flow diagram showing the principal operating steps associated with a method of road design according to the invention.

FIG. 1 is a flow diagram showing the principal steps associated with an optimization process according to the invention using linear or nonlinear programming. Three approaches are described differing in the number of variables and the performance time.

1. Grid Optimization Approach:

The optimization is reached through nonlinear programming when the objective is to minimize the total cost of the earthworks. The required variables are differences between proposed road elevations and existing topography elevations at all grid points on the right of way. The relevant constraints are prevailing roads standards.

Figure 2:
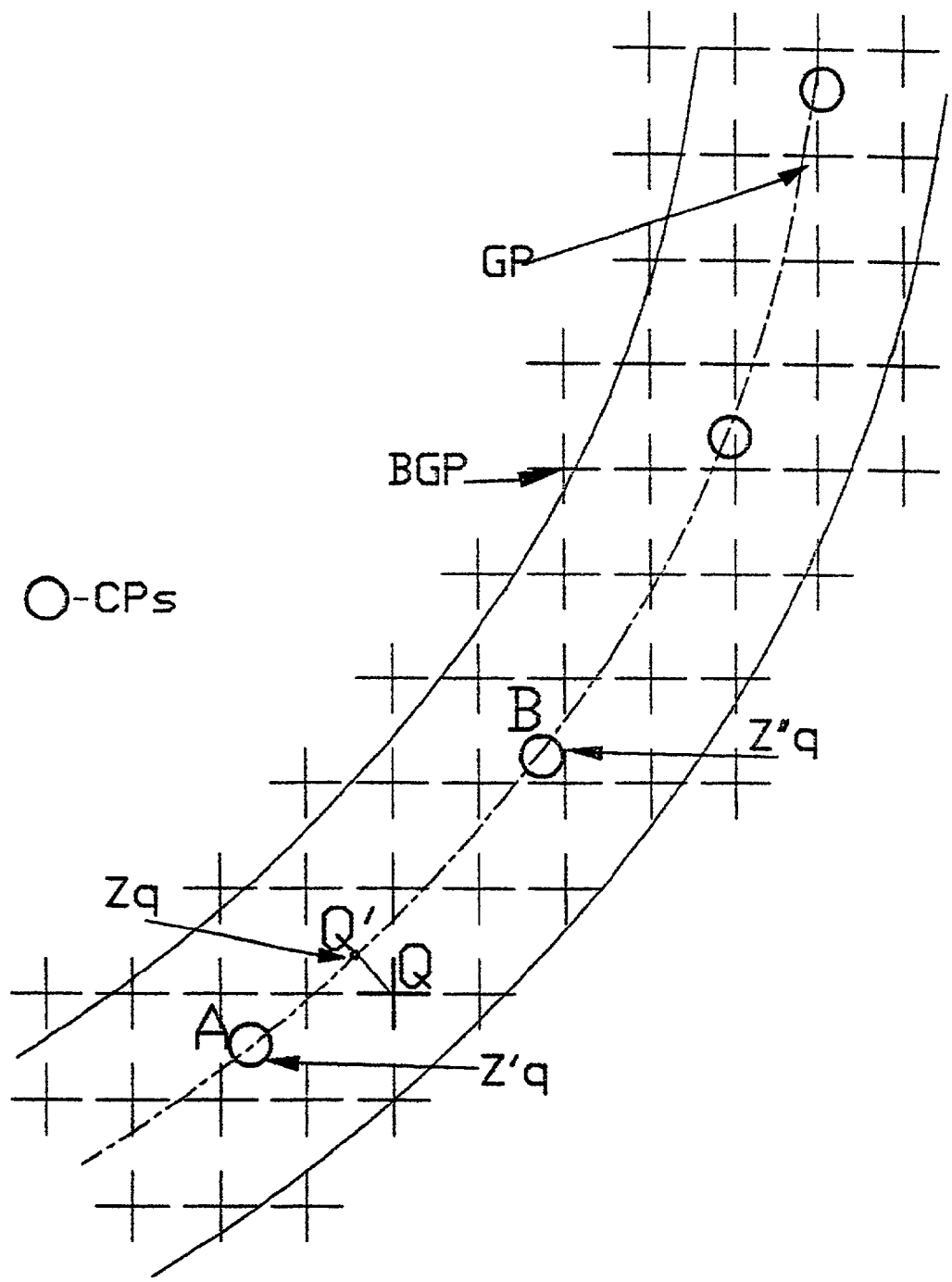
FIG. 2 shows schematically a relation between grid and control points for grid optimization.

FIG. 2 shows in plan view a road surface 10 having superimposed thereon an imaginary matrix of grid points designated GP each being a node point of a rectangular grid of definite size (e.g. 5 m×5 m) that are located on the right of way. Boundary grid points designated BGP are grid points located on edges of roads, i.e. points for which distance to the road centerline is equal to half of the road width (with some tolerance). Boundary grid points are used for cost estimation of retaining walls which support the earth under the road surface when the surface of the road is higher than that of the surrounding landscape, thus requiring earth to be filled to the level of the road surface. Likewise, retaining walls are built when the level of the surrounding landscape is higher than that of the road surface, thus requiring the earth to be cut down to the level of the road surface. In this case, the retaining walls serve the function of preventing rubble from falling on to the road surface. Both grid points and boundary grid points are quantified by coordinates in 3-dimensional space.

Also shown are control points designated CP being 3D points on the proposed centerlines of the road system (e.g. every 100 m). As shown in FIG. 2, control points are not necessarily coincident with grid points. The gradient or "grade" of a road can be changed only at control points, such that each road section spanning a pair of control points is linear.

Referring back to FIG. 1, respective X and Y coordinates of control points and grid points are entered as input data and coordinates Z are an output of the optimization procedure. Preferably, control points are located at points of centerlines where grades of the existing profile are changed, in order to improve the optimization process. Optimization of control points and grid points is formulated as a nonlinear programming task, as follows:

Let $GP = Q(X'_q, Y'_q, Z'_q)$ where Q is some arbitrary point on the road surface.

Therefore Q lies on some specific road within the designated road system. There then exist $A(X_a, Y_a, Z_a)$ and $B(X_b, Y_b, Z_b)$—adjacent control points on the specific road centerline so that Q is located between A and B. This implies that if Q' is the nearest point to point Q on the specific road's centerline including A and B, then Q' is located between A and B. Since Q' is the point nearest to Q, it follows that Q' lies on a line perpendicular to the road centerline along which all points are horizontal. Thus, points Q and Q' must have identical elevations. Therefore for any point Q there exists $\lambda, \mu \in [0,1]$ so that:

$Z'_q = \lambda * Z_a + \mu * Z_b$,

Where:

$Z'_q, Z_a, Z_b$ are proposed elevations of points Q, A, B respectively.

Seeing that by definition the interval AB is linear then it can be shown that:

$\lambda = (AQ, AB)/(AB, AB) \in [0,1]$, and $\mu = 1 - \lambda$.

where AQ and AB are vectors and $\mu$ and $\lambda$ are simply constants of proportionality each being equal to the respective fractional displacement of the point Q from the points A and B.

This implies that the proposed elevation of each grid point may be determined by linear interpolation from the proposed elevations of a corresponding pair of control points.

Let $Z_q = Z'_q - Z_e$, where $Z'_q$ is the proposed elevation and $Z_e$ is the existing elevation at point Q.

The object is to minimize the total cost of the earthworks represented by the following objective function:

$$\sum_{q=1}^{q=N} (F_q(Z_q) \cdot G + W_q(Z_q) + C_q(Z_q) \cdot G + V_q(Z_q)) \cdot G + D \qquad \text{Equation (1)}$$

where:

G is grid size (e.g. 5 m);

$F_q(Z_q)$ is cost of fill at point Q, where the proposed GP elevation is higher than the existing GP elevation ($Z_q > 0$);

$W_q(Z_q)$ is cost of retaining wall for fill at point Q, where proposal GP is above existing GP ($Z_q > 0$);

$C_q(Z_q)$ is cost of excavation at point Q, where the proposed GP is lower than the existing GP ($Z_q < 0$);

$V_q(Z_q)$ is cost of retaining wall for excavation at point Q, where proposed GP is below existing GP ($Z_q < 0$);

D is cost of total difference between fill and excavation volumes moving in or out of entire roads system area.

If $Z_q < 0$ then $W_q(Z_q) = F_q(Z_q) = 0$; also if Q is not a boundary point then $W_q(Z_q) = 0$ since retaining walls are, by definition, built at the road boundary.

If $Z_q > 0$ then $C_q(Z_q) = V_q(Z_q) = 0$. Here also, if Q is not a boundary point then $V_q(Z_q) = 0$.

Let price of fill=f0 (money unit/volume unit), then $F_q(Z_q) = 0.5 * f0 * (|Z_q| - Z_q)$, Hence, if $Z_q < 0$ then $F_q(Z_q) = 0$.

If excavation price is constant=c0, then $C_q(Z_q) = 0.5 * c0 * (|Z_q| - Z_q)$.

Hence, if $Z_q > 0$ then $C_q(Z_q) = 0$.

If excavation price depends on $Z_q$ (e.g. due to different geology layers), prices may be entered as a table:

For $0 > aj_q > Z_q > bj_q$ the corresponding price is $Pj_q$ and then:

$$C_q(Z_q) = 0.5 \cdot \left( \sum_{j=1}^{j=K_q} (|Z_q - aj_q| + aj_q - |Z_q - bj_q| - bj_q) \cdot Pj_q + \right.$$
$$\left. \{|Z_q - bK_q| - (Z_q - bK_q)\} \cdot P_q \max \right) \qquad \text{Equation (2)}$$

If $Z_q > 0$, then $C_q(Z_q) = 0$.

$K_q$ is number of different geological layers each having a specified excavation price at the point Q, $aj_q$, $bj_q$ —upper and lower depths of $j^{th}$ layer at point Q, $Pj_q$—excavation price of $j^{th}$ layer at point Q (order of layers may be dependent on Q).

$P_q$max is excavation price for $Z_q < bK_q$. (Here $Z_q$, $aj_q$, $bj_q$, $bK_q < 0$).

If Q is BGP, then:

$$V_q(Z_q) = 0.5 \cdot \left( \sum_{j=1}^{j=M} (|Z_q - e_j| + e_j - |Z_q - f_j| - f_j) \cdot F_j + \right.$$
$$\left. \{|Z_q - fM| - (Z_q - fM)\} \cdot F\max \right) \qquad \text{Equation (3)}$$

where:

for $0 > e_j > Z_q > f_j$ corresponding price of retaining wall for excavation is $F_j$ denoting different unit costs of a retaining wall for different soil composition and $(e_j, f_j)$ is an interval having a discrete price for excavating the retaining wall.

M is number of levels of wall for excavation prices.

Fmax is excavation wall price for $Z_q < fM < 0$.

If $Z_q > 0$, then $V_q(Z_q) = 0$.

$$W_q(Z_q) = 0.5 \cdot \left( \sum_{j=1}^{j=L} (|Z_q - c_j| - c_j - |Z_q + d_j| + d_j) \cdot W_j + \{|Z_q - d_L| + (Z_q - d_L)\} \cdot V\max \right)$$ Equation (4)

where:

for $0 < c_j < Z_q < d_j$ corresponding price of retaining wall for fill is $W_j$:

L is number of levels of fill wall prices.

Wmax is wall price for $Z_q > dL$.

If $Z_q < 0$, then $W_q(Z_q) = 0$.

Finally:

$$D = 0.5 \cdot G \cdot G \cdot \left\{ I \cdot \left( \sum_{q=1}^{q=N} Z_q + \left| \sum_{q=1}^{q=N} Z_q \right| \right) + O \cdot \left( \left| \sum_{q=1}^{q=N} Z_q \right| - \sum_{q=1}^{q=N} Z_q \right) \right\}$$ Equation (5)

where:

I is the price of conveying fill deficiency from another site to roads system area;

O is the price of removing of redundant fill outside of the roads system area;

N is total number of grid points on roads system.

Constraints include five sets:

a) Constraints of road surface $$Z_q = \lambda_q * Z'_q + \mu_q * Z''_q - Zq_e + \lambda_q * Z'_e + \mu_q * Z''_e,$$

Where:

q=1, . . . ,N;

$Z'_q$, $Z''_q$ are the relative elevations of the adjacent control points A and B having point Q located between them;

$Z_q e$ is existing elevation at point Q.

$Z'_e$, $Z''_e$ are existing elevations at adjacent control points.

$\lambda_q$, $\mu_q$ are coefficients of linear interpolation of proposal elevation at point Q.

The above constraint expresses the requirement that the point Q is realized as the linear interpolation between the control points A and B, thus ensuring uniformity along the path described between points A and B.

Normally there are more than two grid points on each interval between control points. Therefore $Z'_q$ and $Z''_q$ can be linearly expressed via each pair $Z_q 1$ and $Z_q 2$ (except for the case where $\lambda_q 1 = \lambda_q 2$ wherein the other pair must be used). This allows elimination of $Z'_q$ and $Z''_q$ from surface constraints, but imposes the following additional constraints:

b) Control points relation constraints:

The above-mentioned linear expressions for $Z'_q$ and $Z''_q$ via pairs of $Z_q$ must be equal to such linear expressions for both adjacent intervals of control points respectively.

c) Constraints of allowable grades (separately for control points near to intersection (e.g. 50 m) and for other control points).

$$|H'+Z'-(H+Z)|/D < S,$$

for all pairs of adjacent control points;

where:

H', H are existing elevations of pair of adjacent control points,

Z', Z are relative elevations of these control points; instead Z' and Z implicit their linear expressions via corresponding Zq of grid points;

D is distance along the road between these control points;

S is maximal allowable grade for road, or for intersection (e.g. S=10% or 6%).

d) Constraints of intersections: (elevations of intersection points of different roads must be same).

$H+Z-(H'+Z')=0$, for all control points at intersections, where H, H' are the existing elevations at the intersection. That is, at the intersection of two roads, the elevation of each road surface must be identical.

e) Constraints for lack or excess total fill or excavation volumes:

$$\sum_{q=1}^{q=N} Z_q > 0 \text{ or } \sum_{q=1}^{q=N} Z_q < 0$$

The expressions which appear in the objective function shown in Equation (1) include absolute values of the respective differences between variables and parameters, thus rendering the objective function non-linear. However, these absolute values can be transformed into linear form:

In case of:

$$\sum_{q=1}^{q=N} Z_q > 0$$ Equation (6)

i.e. fill>cut, Equation (1) is reduced as follows:

$$\sum_{q=1}^{q=N} (F_q(Z_q) \cdot G + W_q(Z_q) + C_q(Z_q) \cdot G + V_q(Z_q)) + \left( 2 \cdot G \cdot I \cdot \sum_{j=1}^{j=N} Z_j \right)$$

It has been noted that the expressions appearing in the objective function contain absolute values, thus rendering the objective function non-linear. This is necessary in order to reflect the fact that regardless of whether material is cut or filled at a particular point, the cost is always positive. On the other hand, because taking absolute values introduces non-linearities, the expression is not amenable to solution using linear programming. In order to allow for the inclusion of absolute expressions whilst also allowing solution by means of linear programming, each of the expressions $Z_q - a_i$, $Z_q - b_i$, $Z_q - c_j$, $Z_q - d_j$, $Z_q - e_j$, $Z_q - f_j$ is replaced by a pair of new variables, as follows:

(*)$Z_q - ai = Uqai_1 - Uqai_2$, i=1, . . . ,Kq, (*)$Z_q - bi = Uqbi_1 - Uqbi_2$, i=1, . . . ,Kq, (*)$Z_q - bKq = UqbK_1 - UqbK_2$;

$(*)Z_q-c_j=Uqcj_1-Uqcj_2, j=1,\ldots,L,$ $(*)Z_q-d_j=Uqdj_1-Uqdj_2, j=1,\ldots,L,$ $(*)Z_q-d_L=UqdL_1-UqdL_2;$ $(*)Z_q-e_j=Uqej_1-Uqej_2, j=1,\ldots,M,$ $(*)Z_q-f_j=Uqfj_1-Uqfj_2, j=1,\ldots,M,$ $(*)Z_q-f_M=UqfM_1-UqfM_2.$ In Equation (1) instead of $|Z_q-a_i|$ substitute $Uqai_1+Uqai_2$ etc., so as to generate a Linear Programming task because all constraints are linear. The constraints no longer include $Z_q$, but only their expressions via $Uq\ldots_1, Uq\ldots_2$.

For example, the nonlinear form of $C_q(Z_q)$ shown in Equation (2):

$$C_q(Z_q) = 0.5 \cdot \left( \sum_{j=1}^{j=Kq} (|Z_q - aj_q| + aj_q - |Z_q - bj_q| - bj_q) \cdot Pj_q + \{|Z_q - bK_q| - (Z_q - bK_q)\} \cdot P_q\max \right)$$

and repeated above will be replaced by linear form:

$$C_q(Z_q) = 0.5 \cdot \left( \sum_{j=1}^{j=Kq} (Uqaj1 + Uqaj2 - Uqbj1 - Uqbj2) \cdot P_j + (2 \cdot UqbK2) \cdot Pq\max \right) \quad \text{Equation (7)}$$

where:

all aj, bj, Pj, $bK_q$, $P_q$max are constants and their sums and products have no influence on the optimization.

It can be shown that, after optimization, one of the substituted pair of variables in the above set of linearized equations marked (*), will be equal to zero whilst the second substituted variable in the corresponding pair will be greater than or equal to zero, i.e. $U\ldots1=0$ and $U\ldots0.2\geq0$, or $U\ldots0.2=0$ and $U\ldots1\geq0$.

The cost can be further reduced by increasing the number of control points and/or by allowing the road surface to have a higher gradient.

The accuracy of the result can be improved by reducing the spacing between adjacent grid points and employing a finer resolution Digital Terrain Model, but this dramatically increases the number of variables.

2. Centerline Optimization—Linear Programming Approach.

The method described above allows cost optimization of the complete surface of a transport route typically comprising many roads or railway track surfaces. There may, however, be times when optimization of the complete surface is impractical or undesirable, for example when time or memory considerations do not allow such optimization. In his case, a lower precision approximation may be achieved by optimizing only the routes' centerlines using linear programming when the objective is to minimize the cumulative difference between the proposed roads' elevations and the existing elevations dictated by the initial topography at the control points, i.e. the difference between cut and fill volumes for centerlines only at each control point.

This approach takes into account only the control points i.e. points on the centerlines of the road system.

Figure 3:
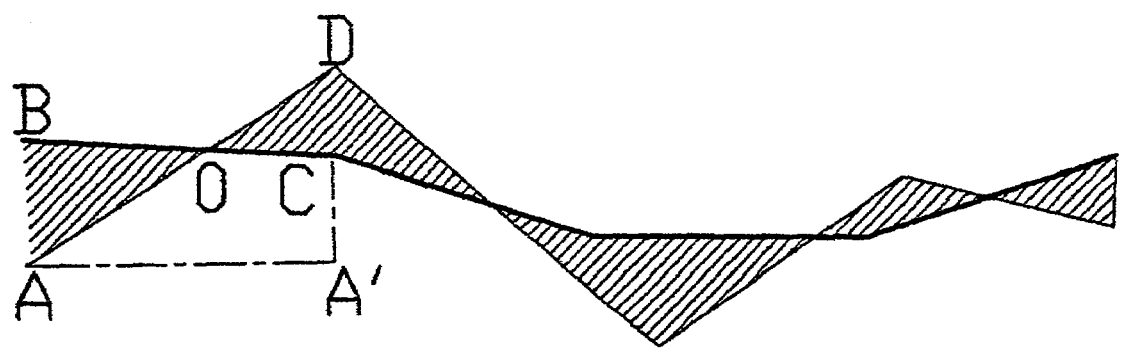
FIG. 3 shows pictorially a "Fill-Cut" geometrical presentation for a centerline linear model objective function.

The gradient of a road can be changed only at the control points which are defined by the end-user, either manually or automatically. Preferably, the control points are located at the points of centerlines where the gradient of the existing profile changes, thereby improving the optimization process. FIG. 3 shows existing and proposed vertical profiles of road centerline.

Suppose SABO is the area of $\Delta$ABO, and SODC is the area of $\Delta$ODC. Then it can be shown that:

$SABO-SODC=AA'(BA+CD)/2;$

Where:

AA' is planar distance between A and D (later $D_{ij}$);

AB, DC are signed relative proposal elevations at control points A and D (later $Z_{ij}$);

SABO is fill quantity;

SODC is cut quantity;

Summing the cut and fill differences for all control points so as to give the cumulative difference for a single road and then summing again for all roads in the system, gives:

$$\sum_{j=1}^{j=K} \sum_{i=1}^{i=N_j} (D_{(i-1)j} + D_{ij}) \cdot Z_{ij} \quad \text{Equation (8)}$$

where:

K is number of roads in the road system;

$N_j$ is number of control points on the $j^{th}$ road of the system;

Dij is the planar distance between adjacent control points with relative elevations $Z_{ij}$ and $Z_{(i+1)j}$ on the $j^{th}$ road;

$D_{0j}=D_{Njj}=0$ by definition;

$j=1,\ldots,K,$ $i=1,\ldots,N_j,$

In the above Equation (8), $Z_{ij}$ can be either positive or negative depending on whether the road surface must be cut or filled at the specific control point described by $Z_{ij}$. In order to construct a set of equations which can be solved using, linear programming techniques, $Z_{ij}$ must be positive for all points. Values of $Z_{ij}$ have units of meters and a value of 10,000 is added to each value of $Z_{ij}$ so that, regardless of its value, there will thus emerge a positive value. To satisfy implicit constraints for all variables: $\geq0$ instead of relative elevations we used $Z_{ij}+10,000$. This has no effect on constraints based only on compensate for the hidden addition of 10,000. It should be noted that the value 10,000 is itself arbitrary and any other value, $\Delta$, may be employed so long as it is sufficiently large that for all values of $Z_{ij}$, the sum of $Z_{ij}+\Delta$ is always ensured to be greater than zero.

In order to compensate for the addition of 10,000 to each value of $Z_{ij}$, there must now be subtracted 10,000 from the cumulative sum in respect of each $Z_{ij}$:

$$-\sum_{j=1}^{j=K}\sum_{i=1}^{i=N_j}(D_{(i-1),j}+D_{ij})\cdot 10{,}000 \quad \text{Equation (9)}$$

This gives:

$$\sum_{j=1}^{j=K}\sum_{i=1}^{i=N_j}(D_{(i-1),j}+D_{ij})\cdot(Z_{ij}+10{,}000)- \quad \text{Equation (10)}$$

$$\sum_{j=1}^{j=K}\sum_{i=1}^{i=N_j}(D_{(i-1),j}+D_{ij})\cdot 10{,}000$$

Equation (10) is the objective function whose absolute value must be minimized in order to minimize the cumulative difference between cut and fill elevations. Two cases must be considered: (i) when the result of Equation (10) is positive and (ii) when the result of Equation (10) is negative. When the cumulative difference between cut and fill elevations given by Equation (10) is negative, the cumulative difference must be maximized, whilst when it is positive, it must be minimized, so that in either case the absolute cumulative difference is minimized. A further constraint is introduced in order to indicate which of the two cases is applicable. This gives:

$$\sum_{j=1}^{j=K}\sum_{i=1}^{i=N_j}(D_{(i-1),j}+D_{ij})\cdot(Z_{ij}+10{,}000)- \quad \text{Equation (11)}$$

$$\sum_{j=1}^{j=K}\sum_{i=1}^{i=N_j}(D_{(i-1),j}+D_{ij})\cdot 10{,}000 < 0 \text{ or } > 0$$

Constraints:
(a) Elevations of intersection points of different roads having respective indices j1 and j2 must be same, i.e.:

$$Z1_{j1}+H1_{j1}-Z1_{j2}-H1_{j2}=0,$$

Where:
$1^{st}$ point of $j1^{th}$ road coincides with $1^{st}$ point of $j2^{th}$ road;
$Z1_{j1}$ and $Z1_{j2}$ are relative elevations at these points;
$H1_{j1}$ and $H1_{j2}$ are existing elevations at these points.
(b) The absolute value of the gradient between adjacent control points (i, j) having respective elevations $H_{ij}$ and $H_{(i+1),j}$ cannot exceed a predetermined allowable maximum value, Gmax:

$$|Z_{i,j}+H_{i,j}-Z_{(i+1),j}-H_{(i+1),j}|/D_{i,j}<Gmax,$$

for j=1, . . . , K; i=1, . . . ,$N_j$.
(c) Elevation at each CP should belong to maximal possible allowable interval:

$$Z_{i_0,i_0} < \quad \text{Equation (12)}$$

$$10{,}000+\max\left\{0, 0.5\cdot\left\{\max_{i=1}^{i=K}\max_{j=1}^{j=N_j}(H_{i,j}-H_{i_0,j_0}-D_{i_0,j_0,i,j}\cdot Gmax)\right\}\right\}$$

and $$Z_{i_0,i_0} > \quad \text{Equation (13)}$$

$$10{,}000-\min\left\{0, 0.5\cdot\left\{\max_{i=1}^{i=K}\max_{j=1}^{j=N_j}(H_{i,j}-H_{i_0,j_0}-D_{i_0,j_0,i,j}\cdot Gmax)\right\}\right\}$$

for $j_0=1, \ldots, K$; $i_0=1, \ldots, N_j$
Where:
$Z_{i_0,j_0}-10{,}000$ is the proposed relative elevation at the $i_0^{th}$ point on $j_0^{th}$ road;
$D_{i_0,j_0,i,j}$ is the shortest distance between $i_0^{th}$ point on $j_0^{th}$ road to $i^{th}$ point on $j^{th}$ road.

This distance is the weighted graph shortest distance where weights of graph arcs are distances according to road paths, i.e. the shortest distance along the route rather than the shortest distance between two points. For this purpose the Shortest Paths Algorithm is used.

Centerline Optimization—Nonlinear Programming Approach.

Figure 4:
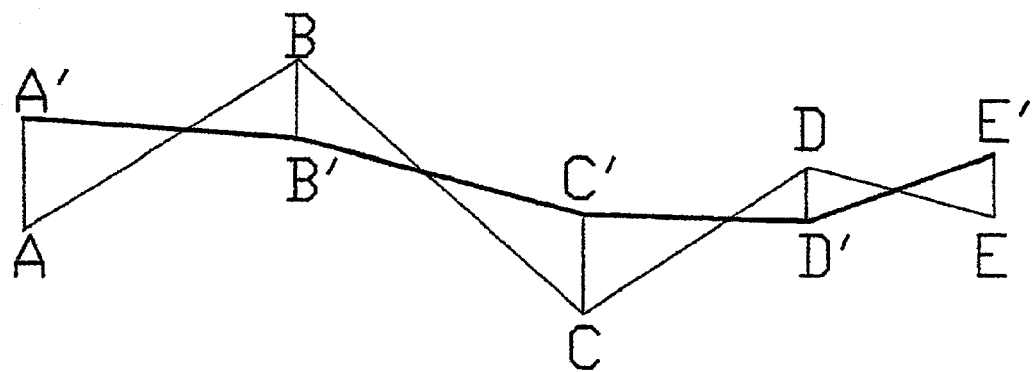
FIG. 4 shows pictorially a relative proposed unsigned elevations for centerline nonlinear model objective function.

FIG. 4 shows the proposed profile of a road to be constructed relative to an existing profile. The optimization is reached through nonlinear programming when objective is cumulative sum of unsigned differences between proposed and existing elevations; variables are differences between proposal road elevations and existing topography elevations at all control points; constraints are present roads standards.

This approach also takes into account only control points i.e. points on centerlines of all roads in the system. It is recommended to locate control points at points of centerlines where the existing profile changes grade, so as thereby to improve the optimization process.

The objective is to minimize the total sum of unsigned differences between proposed and existing elevations calculated for the centerlines only of each road, i.e. for vertical profiles as shown in FIG. 4:

A, B, C, D, E are control points;
AA' is the difference between the proposed elevation and the existing elevation at point A (later $Z_{ij}$).

$$\sum_{j=1}^{j=K}\sum_{i=1}^{i=N_i}|Z_{ij}| \Rightarrow \text{minimum} \quad \text{Equation (14)}$$

where:
K is number of roads; Nj is number of control points on $j^{th}$ road of the system;
Dij is distance between adjacent control points with relative elevations Zij and $Z_{(i+j),j}$ on $j^{th}$ road;
D0j=DNjj=0 by definition;
Constraints:
(a) Elevations of intersection points of different roads must be same:

$$Z1_{j1}+H1_{j1}-Z1_{j2}-H1_{j2}=0,$$

Where:
$1^{st}$ point of $j_1^{th}$ road coincides with $1^{st}$ point of $j2^{th}$ road;
$Z1j1$ and $Z_1j_2$ are proposed elevations at these points;
$H1j1$ and $H_1j_2$ are existing elevations at these points.

(b) Maximal grades at all control points cannot exceed allowable values:

$$|Z_{ij}+H_{ij}-Z_{(i+1),j}-H_{(i+1),j}|/D_{ij}<Gmax,$$

for j=i, . . . ,K; i=1, . . . ,N$_j$.

To transform Equation (14) to linear form of variables substitute for each pair of variables as explained above.

$$Zij=Uij1-Uij2,$$

$$Uij1,Uij2>=0,$$

for j=1, . . . ,K; i=1, . . . ,N$_j$.

So in Equation (1) replace |Zij| by Uij1+Uij2.

Replace all constraints by Zij=Uij1−Uij2 for each corresponding index i, j.

Refinements:

If the control points are located close each to other (e.g. 10–50 m) it is recommended to add as a further constraint that the difference between adjacent road grades should not exceed predefined value per certain distance (e.g. 0.5% per 10 m). The received optimal centerlines may then be approximated by arcs of circles or parabolas or straight lines to satisfy roadway design rules.

If control points are located far each to other (e.g. 50–300 m) arcs of circles or parabolas may be inscribed between straight intervals according to roadway design rules.

After the solution has been obtained, there is started an iteration process of moving entire model along axis Z to minimize total cost whilst taking into account the roads' cross-sections. The result of the optimization is a set of control points elevations that define vertical alignment of the entire road system.

The result can be improved by adding control points and by allowing higher gradient.

Accuracy of the result can be improved by adding density of grid and DTM.

Fixed Points:

By "fixed points" are meant centerline points that must be at a definite height. For such points there are added fixed points constraints:

$$H+Z=E \qquad \text{Equation (15)}$$

where:

Z is relative elevation of the fixed point;

H is existing elevation at this point;

E is required height at the fixed point.

Equation (15) is solved for each fixed point. This requires that each fixed point must be defined as a control point. If there are two or more fixed points, in each optimization method, it is necessary to ensure, before optimization, that grades between the fixed points do not exceed the maximal allowable value. This checking must be done for the shortest distance between fixed points. For that purpose the Shortest Paths Algorithm is used.

Subdivision:

If the optimization process takes into account earthworks required to conform the road elevation to the corresponding elevations of subdivision lots, such as private land adjoining the road boundary, then it is necessary add to the model the proposed sections and boundaries of lots.

Optimization Algorithm for Fill Transportation:

The invention allows determination of the optimal work program for transportation of excavation material at the preliminary planning stage. According to the invention, the suppliers are sites with excess of cut and the customers are sites with lack of fill. The objective is to minimize the sum of excavation volumes multiplied by distances, as given by:

$$\sum_{i=1}^{i=N}\sum_{j=1}^{j=M} D_{ij} \cdot X_{ij} \Rightarrow \text{minimum} \qquad \text{Equation (16)}$$

where:

$X_{ij}$ is fill quantity will be moved from $i^{th}$ supplier to $j^{th}$ customer; i=1, . . . ,N, j=1, . . . ,M;

N is number of suppliers and M is number of customer;

$D_{ij}$ is the shortest distance from ith supplier to $j^{th}$ customer;

Constraints are:

(a) Move no more than each customer needs:

$$\sum_{i=1}^{i=N} X_{ij} < P_j; j = 1; \ldots, M \qquad \text{Equation (17)}$$

Pj is volume of $j^{th}$ customer;

(b) Move no more than each supplier has available:

$$\sum_{j=1}^{j=M} X_{ij} < Q_i; i = 1; \ldots, N \qquad \text{Equation (18)}$$

$Q_i$ is volume of $i^{th}$ supplier;

(c) But move all that is possible:

$$\sum_{i=1}^{i=N}\sum_{j=1}^{j=M} X_{ij} = \min\left(\sum_{j=1}^{j=M} P_j, \sum_{i=1}^{i=N} Q_i\right) \qquad \text{Equation (19)}$$

The shortest distance between two points is calculated by the shortest path algorithm as applied to weighted graphs whose arcs are the road paths and for which the weights are lengths of these paths.

Figure 5:
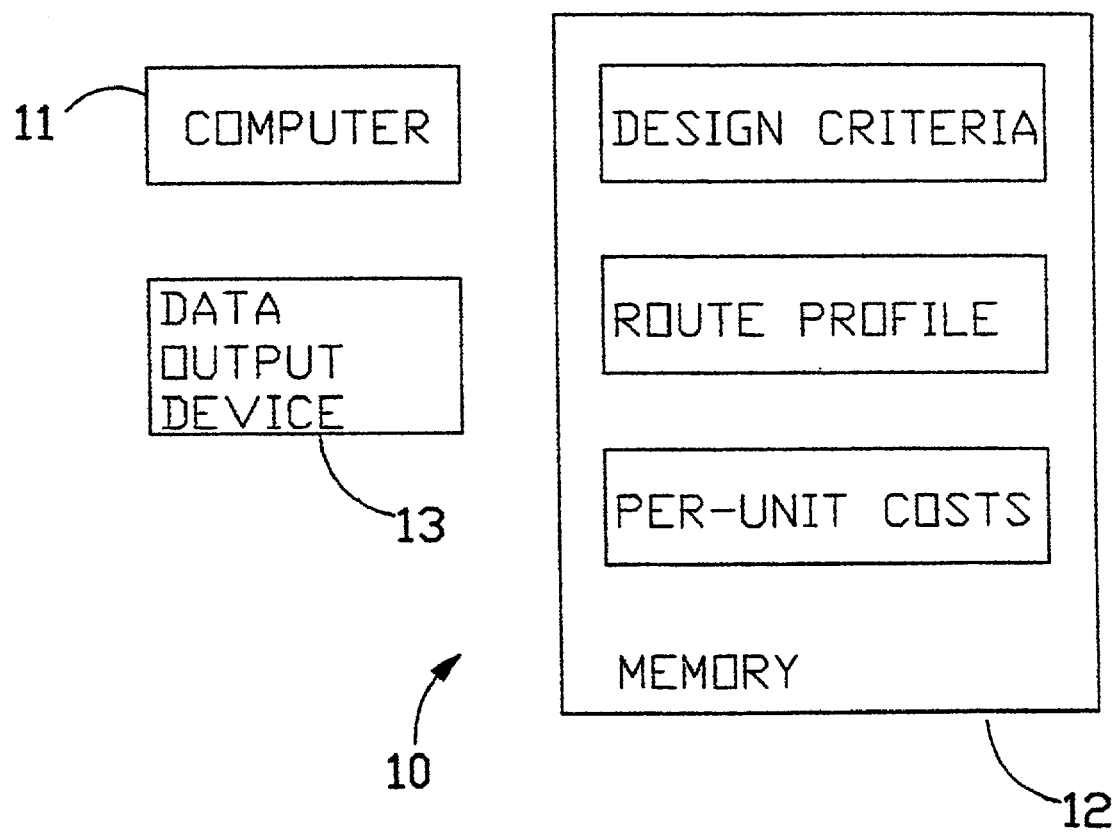
FIG. 5 is a block diagram showing functionally a system for optimizing cut and fill costs for a transportation route in accordance with the invention.

It will be appreciated that the method described above is particularly amenable to being implemented by a suitably programmed computer. FIG. 5 shows functionally a computer-implemented system depicted generally as 10 for designing transportation routes, comprising a computer 11 coupled to a memory 12 and a data output device 13 such as a display monitor, plotter, printer and the like.

Stored in the memory 12 are transportation route data including:

design criteria to be met in respect of at least one of said transportation routes, route profile data showing land heights at sampled points along each of said at least one transportation route, and per-unit cost estimates in respect of land-cut and land-fill operations.

The computer 11 is so programmed as to be responsive to the design criteria, the route profile data and the per-unit cost estimates for computing a height profile of each transportation route which meets the design criteria and for which the land-cut and land-fill operations are adjusted to give a minimum cost in accordance with the method described in detail above with reference to FIGS. 1 to 4 of the drawings.

It will also be understood that the invention contemplates use of a programmable computer such as a PC wherein the method is carried out by means of a custom program stored on diskette, CD-ROM or other suitable data media.

In the method claims which follow, alphabetic and numeric characters used to designate claim steps are provided for convenience only and do not imply any particular order of performing the steps.

The invention claimed is:

1. A computer-implemented method for designing transportation routes, the method comprising the steps of:
   (a) supplying linear constraints of allowable grades to be met in respect of at least one of said transportation routes,
   (b) obtaining route profile 3-D coordinates showing land heights at sampled points along each of said at least one transportation route prior to construction thereof,
   (c) supplying cost estimates per working unit in respect of land-cut and land-fill operations, and
   (d) computing a height profile of said at least one transportation route which meets said constraints and for which said land-cut and land-fill operations are adjusted to give a minimum cost by replacing all non-linear constraints by equivalent linear constraints so as to render the height profile solving using standard linear programming tools.

2. The method according to claim 1, wherein step (d) includes:
   i) representing a surface of the at least one transportation route as a 3-dimensional model having grid points and boundary grid points being grid points located on edges of roads for which distance to the road centerline is substantially equal to half of the road width,
   ii) defining control points such that a gradient of the road surface is constant between adjacent control points by entering X and Y coordinates of said control points as input data, and
   iii) calculating a respective elevation of each point on the road surface between adjacent control points as well as a respective elevation of each control point using linear or non-linear programming.

3. The method according to claim 1, wherein the route profile data includes soil composition and per unit excavation cost for each different level having a discrete soil composition.

4. The method according to claim 1, wherein: the height profile is computed to minimize a total cost of the earthworks represented by the following objective function:

$$\sum_{q=1}^{q=N}(F_q(Z_q)\cdot G + W_q(Z_q) + C_q(Z_q)\cdot G + V_q(Z_q))\cdot G + D$$

where:
G is grid size;
$F_q(Z_q)$ is cost of fill at point Q, where the proposed GP elevation is higher than the existing GP elevation ($Z_q>0$);
$W_q(Z_q)$ is cost of retaining wall for fill at point Q, where proposal GP is above existing GP ($Z_q>0$);
$C_q(Z_q)$ is cost of excavation at point Q, where the proposed GP is lower than the existing GP ($Z_q<0$);
$V_q(Z_q)$ is cost of retaining wall for excavation at point Q, where proposed GP is below existing GP ($Z_q<0$);
D is cost of total difference between fill and excavation volumes moving in or out of entire roads system area;

$Z_q=Z'_q-Z_e$, where $Z'_q$ is the proposed elevation and $Z_e$ is the elevation at point Q, the cost $C_q(Z_q)$ is represented as the solution of a non-linear equation represented by:

$$C_q(Z_q) = 0.5\cdot\left(\sum_{j=1}^{j=K_q}(|Z_q - aj_q| + aj_q - |Z_q - bj_q| - bj_q)Pj_q + \{|Z_q - bK_q| - (Z_q - bK_q)\}\cdot P_q\, \max\right)$$

and each of the absolute expressions $Z_q-a_1$, $Z_q-b_1$, $Z_q-c_j$, $Z_q-d_j$, $Z_q-e_j$, $Z_q-f_j$ is replaced by a pair of new variables, as follows:

(*)$Z_q-ai=Uqai_1-Uqai_2$, $i=1,\ldots,Kq$, (*)$Z_q-bi=Uqbi_1-Uqbi_2$, $i=1,\ldots,Kq$, (*)$Z_q-bKq=UqbK_1-UqbK_2$;

(*)$Z_q-c_j=Uqcj_1-Uqcj_2$, $j=1,\ldots,L$, (*)$Z_q-d_j=Uqdj_1-Uqdj_2$, $j=1,\ldots,L$, (*)$Z_q-d_L=UqdL_1-UqdL_2$;

(*)$Z_q-e_j=Uqej_1-Uqej_2$, $j=1,\ldots,M$, (*)$Z_q-f_j=Uqfj_1-Uqfj_2$, $j=1,\ldots,M$, (*)$Z_q-f_M=UqfM_1-UqfM_2$, so as to render all of the constraints linear and amenable to computation using Linear Programming techniques.

5. The method according to claim 2, further including:
   (e) iteratively shifting said model vertically in order to minimize total cost whilst taking into account the cross-section of each transportation route, so as to derive a set of control points having elevations that define vertical alignment of the transportation routes.

6. The method according to claim 5, further including the step of adding control points and allowing a surface of the transportation route between adjacent control points to have a higher gradient.

7. The method according to claim 5, wherein accuracy is improved by reducing a mutual separation between adjacent grid points.

8. The method according to claim 5, wherein accuracy is improved by providing a higher resolution digital terrain model.

9. The method according to claim 2, wherein at least one of the transportation routes includes one or more subdivision lots adjoining a boundary of the transportation route and in step (d)(i) there are added to the model respective sections and boundaries of said subdivision lots so as to take into account earthworks required to conform an elevation of the transportation route to corresponding elevations of the subdivision lots.

10. The method according to claim 1, wherein the transportation routes include at least one road.

11. The method according to claim 1, wherein the transportation routes include at least one rail track.

12. The method according to claim 1, wherein the transportation routes include at least one pedestrian path.

13. The method according to claim 1 applied to a plurality of transportation routes comprising an integrated project so as optimize excavation costs for the project.

14. A computer-implemented system for designing transportation routes, said system comprising a computer coupled to a memory and a data output device,
   (a) there being stored in the memory transportation route data including:
      i) linear constraints of allowable grades to be met in respect of at least one of said transportation routes,
      ii) route profile 3-D coordinates showing land heights at sampled points along each of said at least one transportation route prior to construction thereof, and
      iii) cost estimates per working unit in respect of land-cut and land-fill operations; and
   (b) the computer being responsive to the linear constraints, the route profile 3-D coordinates and the cost estimates per working unit for computing a height profile of said at least one transportation route which meets said design criteria and for which said land-cut and land-fill operations are adjusted to give a minimum cost by replacing all non-linear constraints by equivalent linear constraints so as to render the height profile solving using standard linear programming tools.

15. The system according to claim 14, wherein the computer is programmed to:
   i) represent a surface of the at least one transportation route as a 3-dimensional model having grid points and boundary grid points being grid points located on edges of roads for which distance to the road centerline is substantially equal to half of the road width,
   ii) define control points such that a gradient of the road surface is constant between adjacent control points by entering X and Y coordinates of said control points as input data, and
   iii) calculate a respective elevation of each point on the road surface between adjacent control points as well as a respective elevation of each control point using linear or non-linear programming.

16. The system according to claim 15, wherein the route profile data includes soil composition and per unit excavation cost for each different level having a discrete soil composition.

17. The system according to claim 14, wherein the computer is programmed to compute the height profile by minimizing a total cost of the earthworks represented by the following objective function:

$$\sum_{q=1}^{q=N} (F_q(Z_q) \cdot G + W_q(Z_q) + C_q(Z_q) \cdot G + V_q(Z_q)) \cdot G + D$$

where:
G is grid size;
$F_q(Z_q)$ is cost of fill at point Q, where the proposed GP elevation is higher than the existing GP elevation $(Z_q>0)$;
$W_q(Z_q)$ is cost of retaining wall for fill at point Q, where proposal GP is above existing GP $(Z_q>0)$;
$C_q(Z_q)$ is cost of excavation at point Q, where the proposed GP is lower than the existing GP $(Z_q<0)$;
$V_q(Z_q)$ is cost of retaining wall for excavation at point Q, where proposed GP is below existing GP $(Z_q<0)$;
D is cost of total difference between fill and excavation volumes moving in or out of entire roads system area;
$Z_q = Z'_q - Z_e$, where $Z'_q$ is the proposed elevation and $Z_e$ the elevation at point Q,
the cost $C_q(Z_q)$ is represented as the solution of a non-linear equation represented by:

$$C_q(Z_q) = 0.5 \cdot \left( \sum_{j=1}^{j=K_q} (|Z_q - aj_q| + aj_q - |Z_q - bj_q| - bj_q) Pj_q + \{|Z_q - bK_q| - (Z_q - bK_q)\} \cdot P_q \max \right)$$

each of the absolute expressions $Z_q-a_1$, $Z_q-b_1$, $Z_q-c_j$, $Z_q-d_j$, $Z_q-e_j$, $Z_q-f_j$ is replaced by a pair of new variables) as follows:

(*)$Z_q-ai=Uqai_1-Uqai_2$, $i=1,\ldots,Kq$, (*)$Z_q-bi=Uqbi_1-Uqbi_2$, $i=1,\ldots,Kq$, (*)$Z_q-bKq=UqbK_1-UqbK_2$;

(*)$Z_q-c_j=Uqcj_1-Uqcj_2$, $j=1,\ldots,L$, (*)$Z_q-d_j=Uqdj_1-Uqdj_2$, $j=1,\ldots,L$, (*)$Z_q-d_L=UqdL_1-UqdL_2$;

(*)$Z_q-e_j=Uqej_1-Uqej_2$, $j=1,\ldots,M$, (*)$Z_q-f_j=Uqfj_1-Uqfj_2$, $j=1,\ldots,M$, (*)$Z_q-f_M=UqfM_1-UqfM_2$, so as to render all of the constraints linear and amenable to computation using Linear Programming techniques.

18. The system according to claim 15, further including:
   (f) a vertical shifter for iteratively shifting said model vertically in order to minimize total cost whilst taking into account the cross-section of each transportation route, so as to derive a set of control points having elevations that define vertical alignment of the transportation routes.

19. The system according to claim 18, further including the step of adding control points and allowing a surface of the transportation route between adjacent control points to have a higher gradient.

20. The system according to claim 18, wherein accuracy is improved by reducing a mutual separation between adjacent grid points.

21. The system according to claim 18, wherein accuracy is improved by providing a higher resolution digital terrain model.

22. The system according to claim 15, wherein: at least one of the transportation routes includes one or more subdivision lots adjoining a boundary of the transportation route, there is further stored in the memory data relating to respective sections and boundaries of said subdivision lots, and the computer is responsive to the respective sections and boundaries of the subdivision lots so as to take into account earthworks required to conform an elevation of the transportation route to corresponding elevations of the subdivision lots.

23. The system according to claim 14, wherein the transportation route data includes data relating to at least one road.

24. The system according to claim 1, wherein the transportation route data includes data relating to at least one rail track.

25. The system according to claim 14, wherein the transportation route data includes data relating to at least one pedestrian path.

26. The system according to claim 14 for processing data relating a plurality of transportation routes comprising an integrated project so as optimize excavation costs for the project.

27. A storage medium storing therein a computer program for carrying out the method of claim 1.

* * * * *